March 14, 1961

F. H. NICOLL 2,975,318

ELECTROLUMINESCENT DEVICES

Filed June 23, 1958

INVENTOR.
FREDERICK H. NICOLL
BY
William A. Zalesak
ATTORNEY

United States Patent Office 2,975,318
Patented Mar. 14, 1961

2,975,318

ELECTROLUMINESCENT DEVICES

Frederick H. Nicoll, Princeton, N.J., assignor to Radio Corporation of America, a corporation of Delaware Filed June 23, 1958, Ser. No. 743,931

7 Claims. (Cl. 313—108)

This invention relates to luminous display devices and particularly to novel means for enhancing the brightness of luminous panels, such as electroluminescent panels.

Presently known electroluminescent panels employ an electroluminescent phosphor positioned between a pair of conductive layers. Upon application of a voltage to the layers, the phosphor luminesces. Great effort is being made to increase the brightness of these panels.

In discussing a different phenomenon, R. W. Wood describes on page 656 of his book "Physical Optics," The Macmillan Co., 1934, the increase in apparent brightness of the light emission from a piece of glass, excited by ultraviolet light, when the glass is viewed edgewise. A similar effect may be observed by placing a water solution of fluorescein dye, for example, in a glass container and exciting the top surface of the solution with blue or short wave length light. The surface will luminesce a very bright green when viewed through the walls of the container in a direction parallel to the surface.

This effect caused by non-Lambertian emission is adaptable to sign-making by the employment of photoluminescent plastics which are excited by artificial or natural light. These plastics may be engraved with letters, for instance, which glow in different colors. The plastic, which is transparent to its emitting wavelength, is made luminescent by incorporating it in solution with certain luminescent organic dye material. The color of the luminescence depends on the particular dye used. Examples of these organic luminescent dyes are presented in "An Introduction to Luminescence of Solids," by Humboldt W. Leverenz, John Wiley and Sons, 1950, on pages 248–252.

Phosphor particles, such as crystals, embedded in a binder do not exhibit the above effects because the individual particles scatter the light. The organic luminescent material, on the other hand, in solution with a transparent surrounding medium, solid or liquid, forms an essentially homogeneous body which allows the light emission from one area of the emitting surface to add to the light emission from another area of the surface so that an observer sees a highly bright integrated light when viewing in a direction parallel to the surface.

An object of this invention is to increase the apparent brightness of electroluminescent panels.

A further object is to combine electroluminescent cells and photoluminescent plastics to produce a luminous device having enhanced brightness.

The above and other objects are achieved in accordance with one embodiment of this invention by positioning a sheet of photoluminescent plastic adjacent to an electroluminescent cell. When a voltage is applied to the electroluminescent cell, light is emitted therefrom and to the photoluminescent plastic, causing bright emission of light from exposed edges of the plastic. The exposed edges in one case are the peripheral ends of the plastic. In another case the exposed edges are constituted by indented characters which are engraved in the surface of the plastic.

In accordance with another embodiment of this invention, a plurality of different color photoluminescent plastic sheets and electroluminescent cells are stacked together in alternate array, and the color emission is controllable by varying the voltages applied to the electroluminescent cells. Thus, an important feature of the invention is that color control of the light emission is achieved by electrical means.

While the specific embodiments used to illustrate the invention utilize solid plastic as a vehicle for the organic luminescent dyes, it is understood that other suitable vehicles such as vitreous material or, in some instances, even liquid solvents may be used.

The invention is more fully described in the following detailed description when read with the drawing in which like reference characters are used to indicate like parts wherein.

Figure 1:
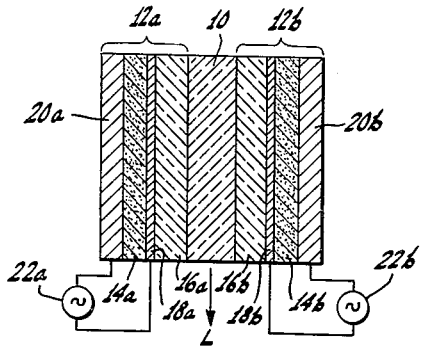
Fig. 1 is a transverse sectional view of an electroluminescent panel according to the invention.

Fig. 1 of the drawing illustrates an electroluminescent device which comprises a photoluminescent plastic sheet 10 positioned between two electroluminescent cells 12a and 12b. The electroluminescent cell 12a consists of an electroluminescent phosphor layer 14a, a glass plate 16a having a transparent conducting coating 18a on one surface thereof, and a conducting element 20a on the other side thereof. The electroluminescent layer 14a is placed between the pair of conductors 18a and 20a, and the pair of conductors is connected to a voltage source 22a. The electroluminescent cell 12b has a similar structure comprising an electroluminescent phosphor 14b, a glass plate 16b having a transparent conducting coating 18b on one surface thereof, and a conducting element 20b. The electroluminescent layer 14b is disposed between the conductors 18b and 20b which are connected to a voltage source 22b.

Upon application of alternating voltages to the electroluminescent cells 12a and 12b from voltage sources 22a and 22b, electric fields are produced in a direction normal to the cells and the plastic sheet 10 thus causing the electroluminescent cells 12a and 12b to emit light to both sides of the plastic sheet 10. This light will be converted by the plastic sheet 10 to light of longer wavelength and of color depending on the composition of the plastic. The emission of light from plastics of the kind described herein is such that the apparent brightness image increases as the viewing angle with respect to the normal increases.

The electroluminescent phosphor in the cells 12a and 12b must be one which emits light of shorter wavelength than that of the photoluminescent plastic 10. In general, phosphors which emit in the ultraviolet or blue regions of the spectrum, such as boron nitride and copper activated zinc sulfide, are preferred. Yellow-emitting phosphors have been successfully used in conjunction with red-emitting plastics.

The electroluminescent phosphor is preferably embedded in a transparent dielectric, such as an epoxy resin. The transparent conducting coatings 18a and 18b may be formed from tin oxide which may be evaporated onto the glass plates 16a and 16b. The conducting elements 20a and 20b may be reflecting coatings made of aluminum or silver or may be transparent conductors. It may be preferable to omit the glass plates 16a and 16b, in which case transparent conducting films of silver, gold, or another metal may be applied directly to the plastic sheet 10.

Figure 2:
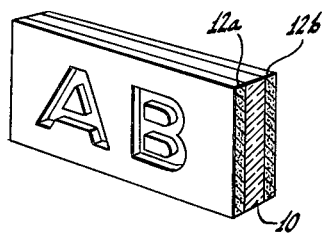
Fig. 2 is a perspective view of a display panel embodying the invention.

Fig. 2 shows a luminous display panel for use as a sign. The panel comprises a flat photoluminescent plastic sheet 10 sandwiched between two sheet-like electroluminescent cells 12a and 12b. Preferred designs or characters, such as the letters "A" and "B," shown by way of example, are engraved on the front side of the panel with the engraving extending through the front electroluminescent cells 12a and partially through the plastic sheet 10. The portion of the engraving cut in the plastic sheet 10 is preferably beveled so as to expose a sizable section of the plastic sheet 10 to view. The engraved characters which are cut into the plastic sheet 10 so as to expose indented surfaces at an angle to the plane of the sheet 10 will glow with pronounced brightness. Moreover, if the peripheral edges of the plastic 10 are exposed, as shown, they also will glow thereby producing a luminous frame for the panel.

Luminescent panels according to the invention thus afford the advantage of compactness, since the electroluminescent cells which constitute the excited source are placed in close association with the light-emitting plastic.

Figure 3:
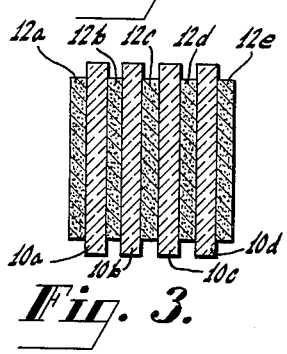
Fig. 3 is a transverse sectional view of a stacked layer device embodying the invention and operable to produce color changes.

In the embodiment shown in Fig. 3 a plurality of electroluminescent cells 12a to 12e and photoluminescent plastic sheets 10a to 10d are stacked together in an intercalated manner so that the exposed ends of the plastic sheets define a generally square area of bright emission. The plastic sheets 10a to 10d may all be of the same color, in which case the whole area will appear to glow in one color. By using different color plastics, color selection may be obtained by varying or controlling the separate voltages applied to the electroluminescent cells 12a to 12e. It is understood that the conductors of electroluminescent cells adjacent the plastic sheets are transparent to permit the luminescence from each cell to illuminate the plastic sheets.

Figure 4:
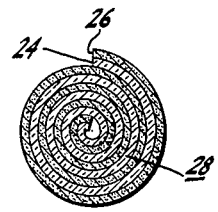
Fig. 4 is a transverse sectional view of a rolled layer device embodying the invention.

In the embodiment shown in Fig. 4, a photoluminescent plastic sheet 24 and an electroluminescent sheet-like cell 26 are intervolved and arranged in a cylindrical type roll so that the end 28 of the cylindrical roll defines approximately a circular area of emission. As in the embodiment of Fig. 3, a plurality of electroluminescent cells may be interposed with photoluminescent plastic sheets of different colors to produce different color combinations controllable with voltage.

Figure 5:
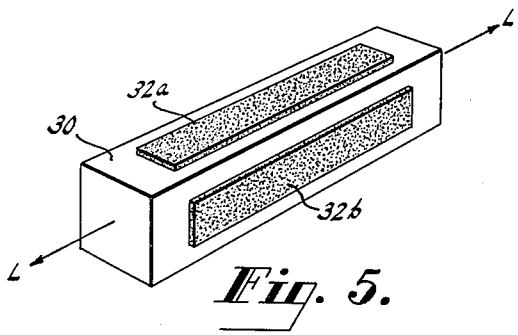
Figs. 5 and 6 are perspective views showing the invention embodied in rod-like devices useful in television.

In another embodiment of the invention, shown in Fig. 5, single elemental light emitting units of small size can be made from photoluminescent plastic rods whose lateral surfaces carry electroluminescent cells. Fig. 5 illustrates a square rod 30 of plastic having four electroluminescent cells 32a to 32d, only two of the cells 32a and 32b being shown. When the cells are excited, light emission is produced at each end of the rod 30.

Figure 6:
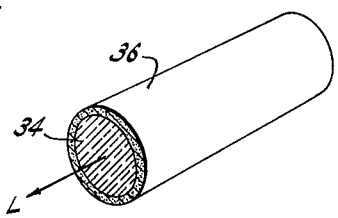

In Fig. 6 a cylindrical photoluminescent plastic rod 34 has a single cylindrical electroluminescent cell 36 coated on its surface. When the electroluminescent cell is excited upon the application of a voltage, a circular area of light is produced in the end of the rod 34.

Figure 7:
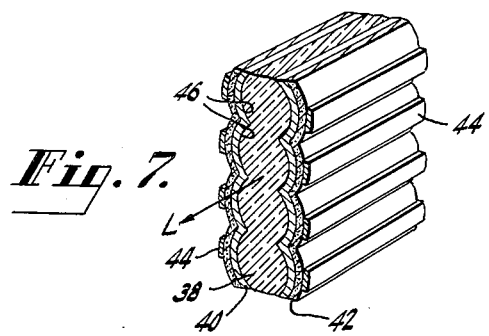
Fig. 7 is a perspective view, partly in section, showing the invention embodied in a lenticular device to produce a line of emitting lens-type elements.

Luminescing rods as described above may be grouped in an array for displaying picture information such as in television. Furthermore, the rods can be arrayed in various color groups such as combinations of red, blue, and green, to produce color pictures. Thus, as illustrated in Fig. 7, a corrugated or lenticular sheet of plastic 38 is provided with transparent conductive strips 40, an electroluminescent phosphor layer 42, and light reflecting conducting strips 44 on both sides of the plastic. The sheet 38 is formed with lenticular sections 46 which are designed to prevent the pair of electroluminescent cells associated with a given section from exciting an adjacent section.

A feature of the invention is the great increase in the apparent brightness of electroluminescent cells caused by combining electroluminescent cells with luminescent plastics in compact units. These units are useful for various display purposes, such as in signs or for television, and are capable of producing monochrome or multi-color output.

What is claimed is:

1. An electroluminescent device comprising an electroluminescent cell and a body of photoluminescent material positioned in optical relationship with said electroluminescent cell, and characters engraved partially through said photoluminescent material whereby bevelled edge portions of said photoluminescent material are exposed.

2. An electroluminescent device comprising an electroluminescent cell and a photoluminescent sheet, said cell and said sheet being coextensively positioned in contiguous relationship and said photoluminescent sheet having a plurality of characters engraved therein whereby indented surfaces at an angle of less than 90° to the plane of said sheet are exposed.

3. An electroluminescent device comprising a pair of spaced electroluminescent cells, a photoluminescent sheet sandwiched between said electroluminescent cells, said cells being adapted to have a voltage applied thereto, at least one edge of said photoluminescent sheet being exposed, and said photoluminescent sheet having a plurality of configurations cut therein and through one of said electroluminescent cells whereby indented surfaces at an angle of less than 90° to the plane of said photoluminescent sheet are exposed.

4. An electroluminescent device as in claim 3 wherein said photoluminescent sheet emits light of a color different from that emitted by said electroluminescent cells.

5. An electroluminescent device as in claim 3 wherein said electroluminescent cells luminesce in different colors.

6. An electroluminescent device as in claim 3 wherein both of said electroluminescent cells emit light of one color.

7. An electroluminescent device as in claim 6 wherein said photoluminescent sheet emits light of a color different from that emitted by said electroluminescent cells.

References Cited in the file of this patent

UNITED STATES PATENTS

| 2,749,480 | Ruderfer | June 5, 1956 |
| 2,768,310 | Kazan | Oct. 23, 1956 |

FOREIGN PATENTS

| 1,155,597 | France | May 6, 1958 |

OTHER REFERENCES

R.C.A. Technical Note No. 10, Aug. 9, 1957.
R.C.A. Technical Note No. 18, Aug. 9, 1957.